(12) United States Patent
Quantz et al.

(10) Patent No.: US 6,584,890 B1
(45) Date of Patent: Jul. 1, 2003

(54) HIGH PRODUCTION NUTCRACKING APPARATUS FOR PROCESSING RELATIVELY SMALL NUTS

(75) Inventors: James B. Quantz, Lexington, SC (US); Pascal W. Pitts, Cayce, SC (US); John L. Feaster, Columbia, SC (US)

(73) Assignee: Machine Design Incorporated, West Columbia, SC (US)

( * ) Notice: Subject to any disclaimer, the term of this patent is extended or adjusted under 35 U.S.C. 154(b) by 0 days.

(21) Appl. No.: 10/299,221

(22) Filed: Nov. 19, 2002

(51) Int. Cl.$^7$ ................................................. A23N 5/00
(52) U.S. Cl. ............................. 99/571; 99/574; 99/581
(58) Field of Search ........................... 99/568, 571–576, 99/577–579, 580–583; 426/481, 482; 30/120.1–120.5; 198/622

(56) References Cited

U.S. PATENT DOCUMENTS

| | | | | |
|---|---|---|---|---|
| 1,160,376 A | * | 11/1915 | Gilson | 99/569 |
| 1,208,324 A | * | 12/1916 | Canale | 99/572 |
| 1,342,691 A | * | 6/1920 | Pape | 99/582 X |
| 1,470,247 A | * | 10/1923 | Wilms | 99/572 |
| 1,901,798 A | * | 3/1933 | Boomer | 99/586 X |
| 2,067,566 A | * | 1/1937 | Field | 99/582 |
| 2,635,662 A | * | 4/1953 | Doering et al. | 198/622 X |
| 2,903,134 A | * | 9/1959 | Ashlock, Jr. | 99/569 X |
| 3,561,513 A | * | 2/1971 | Lindsey | 99/571 |
| 3,621,898 A | * | 11/1971 | Turner | 99/571 |
| 3,871,275 A | | 3/1975 | Quantz | |
| 4,332,827 A | | 6/1982 | Quantz | |
| 4,418,617 A | | 12/1983 | Quantz | |
| 4,441,414 A | | 4/1984 | Quantz | |
| 5,623,867 A | | 4/1997 | Quantz | |
| 6,182,562 B1 | | 2/2001 | Quantz et al. | |
| 6,205,915 B1 | | 3/2001 | Quantz | |

* cited by examiner

Primary Examiner—Timothy F. Simone
(74) Attorney, Agent, or Firm—Alston & Bird LLP

(57) ABSTRACT

A high production nutcracking apparatus wherein the nuts are fed from a hopper on a feed conveyor which has an upwardly inclined segment which passes through the hopper, a horizontal segment which leads to the cracking apparatus, and an arcuate transition juncture which is between the two segments. The feed conveyor includes a plurality of nut transport elements mounted in succession on a feed chain, and each transport element includes an upwardly facing receptacle for receiving a single nut which is then advanced to the cracking apparatus. To permit the apparatus to process relatively small nuts, such as pecan seedlings, the elements each include a longitudinal notch in an upper corner, and a spacer bar is fixedly mounted so as to occupy the notches of the elements as they move through the hopper. The nuts are singularized and oriented in the receptacles of the elements while being advanced on the feed conveyor.

14 Claims, 4 Drawing Sheets

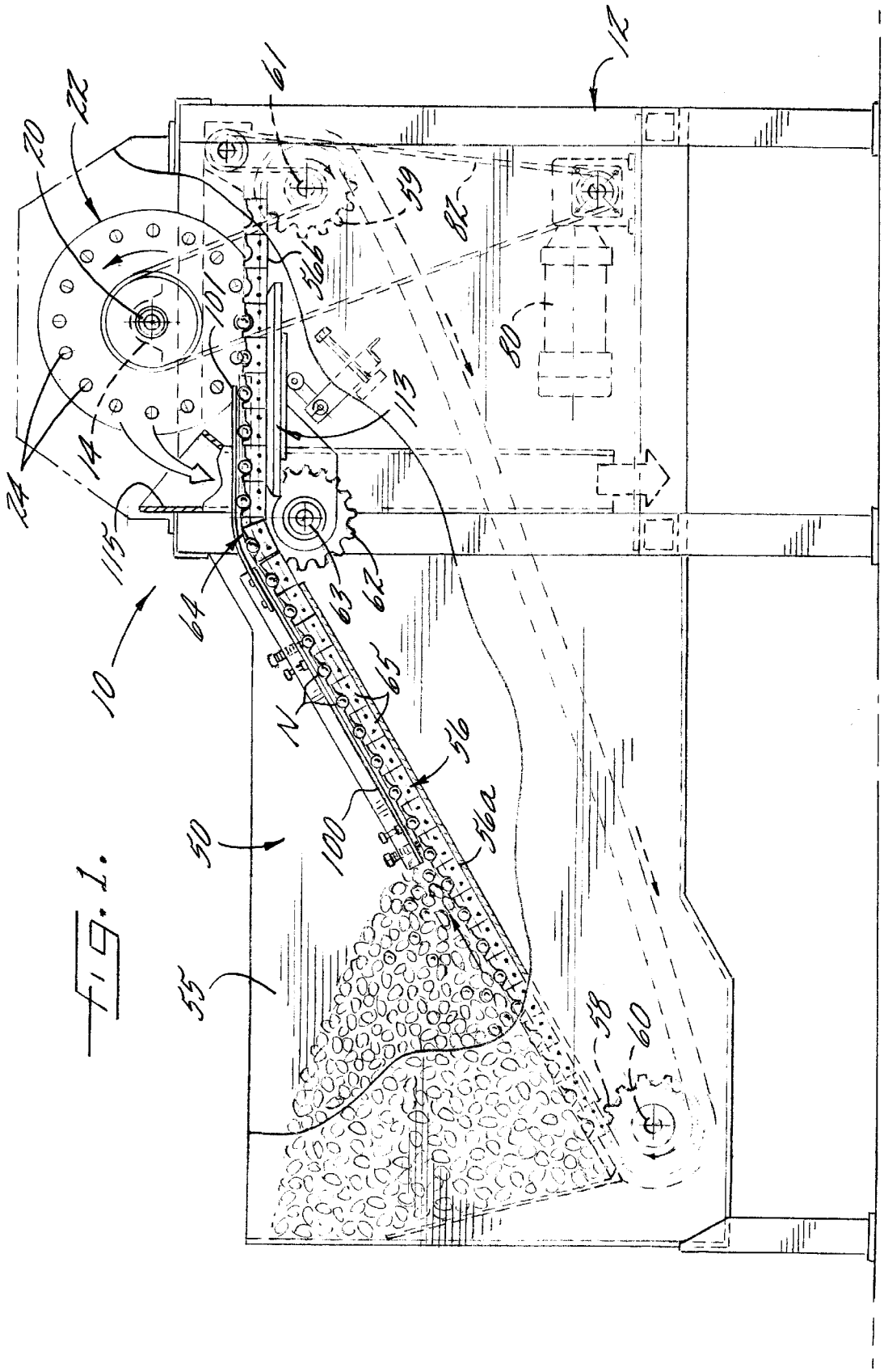

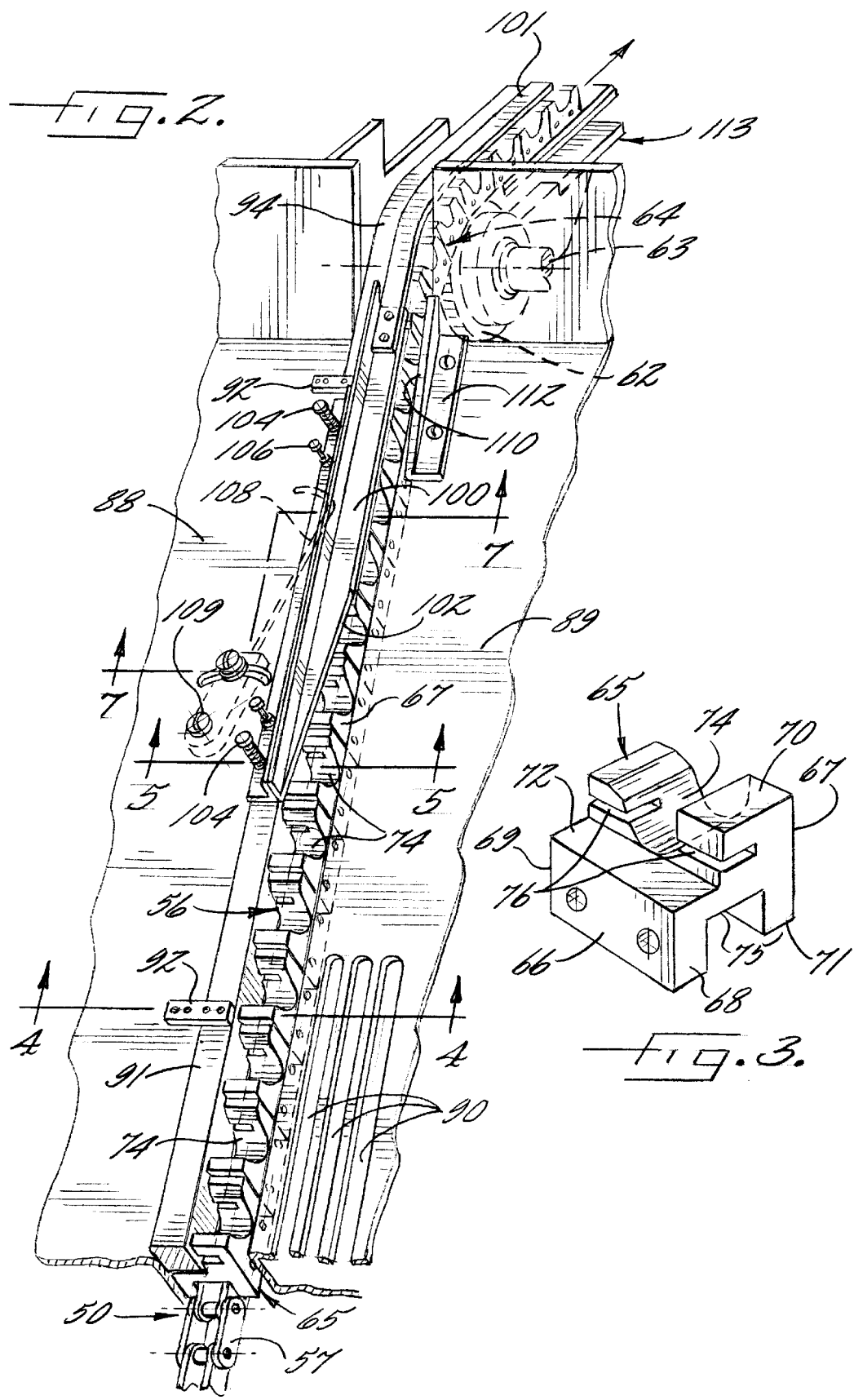

HIGH PRODUCTION NUTCRACKING APPARATUS FOR PROCESSING RELATIVELY SMALL NUTS

BACKGROUND OF THE INVENTION

The present invention relates to an apparatus for cracking nuts at high production rates, and which is configured for the processing of relatively small nuts, such as pecan seedlings.

In prior U.S. Pat. No. 6,205,915, there is disclosed a high production nutcracking apparatus wherein a plurality of cracking units are arranged on a rotatable turret, with each cracking unit having an opening adapted to receive an individual nut from a feed conveyor. Each cracking unit includes a mechanism for then cracking the nut as the turret continues to rotate, which is actuated by a pneumatic control system.

The feed conveyor as disclosed in the '915 patent includes a feed chain which comprises a plurality of nut transport elements which are mounted in succession, and with each nut transport element having an upwardly open receptacle for receiving an individual nut as it advances through a feed hopper. The feed chain extends in an upwardly inclined direction through the feed hopper and it is designed to feed the nuts from the hopper at a relatively high speed to the cracking units, while effectively orienting the nuts in the respective receptacles so that they may be engaged by the cracking units in an end to end orientation. To singulate and orient the nuts in the receptacle, there is provided a deflecting plate which overlies a portion of the upwardly inclined segment.

The nutcracking apparatus of the above patent is designed to efficiently crack nuts of relatively large size, such as hybrid pecans, which are designated as size 12 to 15 (i.e. 12/16 to 15/16 inches in diameter). When the apparatus attempts to crack nuts of smaller size, such as size 8 to 11 pecan seedlings, problems develop in that multiple nuts will remain in the receptacles of the feed elements, or the nuts will be misaligned in the receptacles of the nut transport elements. In such cases, the cracking unit will not pick up the nuts, or it may throw out one or both nuts after pick up but without proper cracking. This greatly reduces the efficiency of the cracking process, and leads to further problems when the nuts are fed from the cracking apparatus to a conventional sheller and an air separator.

It is accordingly an object of the present invention to provide a nutcracking apparatus which is able to efficiently crack nuts of relatively small size.

It is a further object to provide an apparatus of the described type which is able to be easily constructed so as to be able to efficiently process relatively small nuts, by converting the apparatus of the prior art to the novel configuration of the present invention, utilizing a small number of new components.

SUMMARY OF THE INVENTION

These and other objects and advantages of the present invention are achieved in the embodiment illustrated herein by the provision of a nut feeding apparatus which comprises a hopper for storing a relatively large quantity of the nuts to be cracked, and an endless conveyor which has an upper run extending through the hopper to a delivery point exteriorly thereof. The conveyor includes a feed chain and a plurality of nut transport elements mounted in succession on the feed chain. Each element is of generally block-like configuration and has an upper face. The upper face of each element has a longitudinally extending notch formed in an upper corner thereof, and a generally semi-cylindrical upwardly facing receptacle extends laterally across the remainder of the upper face and is sized to receive an individual nut.

A drive system is provided for rotating the endless conveyor such that the nut transport elements move in succession through the hopper and to the delivery point, and a singularizing and orienting means is provided for effectively removing any nuts in excess of one from the receptacle of each nut transport element and for effectively orienting the nut with its end to end direction extending along the receptacle.

With the above construction, the receptacles are reduced in size as compared to the receptacles of the nut transport elements of the prior art, and the smaller receptacles are thus able to process nuts of smaller size. Also, the conversion of the apparatus of the prior art to the configuration of the present invention may be readily accomplished by merely replacing the nut transport elements with those of the new configuration, and then adding the spacer bar which occupies the space which was removed to form the notches in the receptacles. A fundamental re-design of the apparatus of the prior art to render it capable of efficiently processing nuts of reduced size, is therefore not required.

BRIEF DESCRIPTION OF THE DRAWINGS

Some of the objects and advantages of the invention having been stated, others will appear as the description proceeds, when taken in connection with the accompanying drawings, in which:

FIG. 1 is a partly sectioned side elevation view of a nutcracking apparatus which embodies the features of the present invention;

FIG. 2 is a fragmentary perspective view of the feed conveyor and the singularizing and orienting means of the present invention;

FIG. 3 is a perspective view of one of the nut transport elements of the present invention;

DETAILED DESCRIPTION OF THE PREFERRED EMBODIMENT

Referring more specifically to the drawings, a nutcracking apparatus embodying the features of the present invention is illustrated generally at 10 in FIG. 1. The apparatus includes a rectangular box-like frame 12 which supports a pair of bearing blocks 14 which rotatably mount a central shaft 20 which defines a horizontal central axis.

Figure 9:
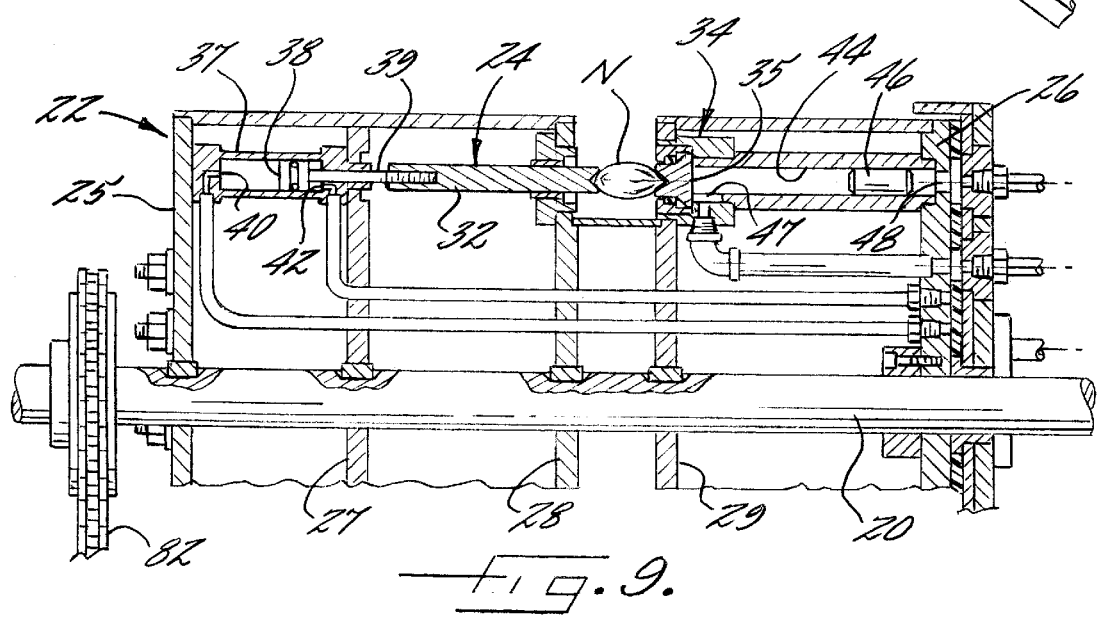
FIG. 9 is a fragmentary sectional view of the upper portion of the turret of the cracking apparatus, and illustrating one of the cracking units.

As best seen in FIGS. 1 and 9, a turret 22 is fixedly mounted to the shaft 20 so as to be rotatable with the shaft about the central axis. The turret 22 comprises a plurality of elongate cracking units 24 which are circularly arranged about the shaft and supported by the end plates 25 and 26, and the intermediate plates 27, 28 and 29. There are sixteen cracking units in the illustrated embodiment and the units extend generally parallel to each other and to the central axis.

Each of the cracking units 24 comprises an anvil 32, and a cracking die assembly 34 which includes a cracking die 35. The anvil and cracking die assembly are mounted in an axially aligned, opposed relationship to define an opening for receiving a nut N therebetween. More particularly, the means for mounting the anvil 32 includes a first air cylinder 37, a piston 38 slidably disposed within the cylinder 37, a piston rod 39 interconnecting the piston and anvil, a first air port 40 disposed adjacent the rearward end of the cylinder, and a second air port 42 disposed adjacent the forward end of the cylinder. As will be apparent, movement of the piston 38 results in a corresponding movement of the anvil 32, either forwardly toward the cracking die assembly 34 or rearwardly therefrom. Such movement is controlled by air which is selectively provided to the first and second ports 40, 42 in a manner more fully disclosed in U.S. Pat. Nos. 4,418,617; 4,441,414; and 6,182,562, the disclosures of which are expressly incorporated herein by reference.

The cracking die assembly 34 is more fully described in the above referenced patents, and it includes the cracking die 35, and a second air cylinder 44. A free floating shuttle 46 is mounted so as to be closely received within the bore of the cylinder 44. In addition, there is provided an air port 47 adjacent the forward end of the cylinder and a further port 48 which extends axially through the rearward end of the cylinder.

The control system for cyclically actuating the cracking unit includes an air control system whereby air is selectively introduced into the four ports 40, 42, 47, and 48. More particularly, upon receiving a nut N in the opening between the anvil 32 and cracking die assembly 34, air is first introduced into the port 40 so that the piston 38 and anvil 32 are moved forwardly and such that the anvil 32 operatively engages one end of the nut N in the opening. The nut thereby becomes supported between the anvil 32 and cracking die 35. The anvil 32 and cracking die 35 thereby also serve to compressively stress the retained nut. High pressure air is next injected through the port 48 and into the air cylinder 44, such that the shuttle 46 is thrust forwardly along the cylinder and impacts against the rear end surface of the cracking die 35, causing the cracking die to sharply advance a short distance forwardly against the nut and thereby crack its shell. The air in front of the advancing shuttle is permitted to exhaust through the port 47. Air next enters the port 42, causing the piston 38 and anvil 32 to move rearwardly and release the nut, and as a final step, air is caused to enter the port 47 and thereby return the shuttle 46 to its rearward position. The apparatus is then in position to receive another nut to be cracked, with the above cycle being cyclically repeated. Further details regarding the air control system for cyclically actuating the apparatus 10 may be obtained from the above noted prior patents.

The apparatus of the present invention further includes an apparatus 50 for advancing and delivering a plurality of nuts individually in succession along a path of travel to the rotating turret 22. This nut delivering apparatus includes a hopper 55 for storing a relatively large quantity of the nuts to be cracked, and an endless feed conveyor 56 which includes a feed chain 57 (FIG. 2) and a pair of supporting sprockets 58, 59 mounted respectively on the shafts 60, 61, which support the feed chain. Also, there is provided an intermediate supporting sprocket 62 mounted on the shaft 63 as further described below.

The conveyor 56 is mounted for movement about the sprockets 58, 59, and includes an upper run which extends through the lower portion of the hopper 55 and along an upwardly inclined path of travel to a delivery point adjacent the bottom dead center position of the turret 22. More particularly, the upper run of the endless conveyor includes an upwardly inclined segment 56a extending through the lower portion of the hopper, and a substantially horizontal segment 56b extending from the upwardly inclined segment to a delivery point which is tangentially aligned along the bottom dead center position of the cracking units 24. The upwardly inclined segment 56a and the horizontal segment 56b define a transition juncture 64 therebetween and which is also defined by the supporting sprocket 63. More particularly, the transition juncture 64 is arcuately curved in accordance with the circumferential curvature of the supporting sprocket 63.

A plurality of block-like nut transport elements 65 are mounted in succession along the feed chain 57. As best seen in FIG. 3, each element 65 includes parallel opposite sides 66, 67, parallel opposite ends 68, 69, an upper face 70 and a bottom face 71. The upper face 70 of the element has a longitudinally extending notch 72 formed in the upper corner along the side 66, and a generally semi-cylindrical receptacle 74 extends laterally across the remainder of the upper face of the element, and so as to communicate with the notch 72 and the opposite side 67. By design, each receptacle 74 is sized to supportingly receive a single nut of the size to be cracked and which is oriented with its end to end direction extending axially along the receptacle.

Figure 4:
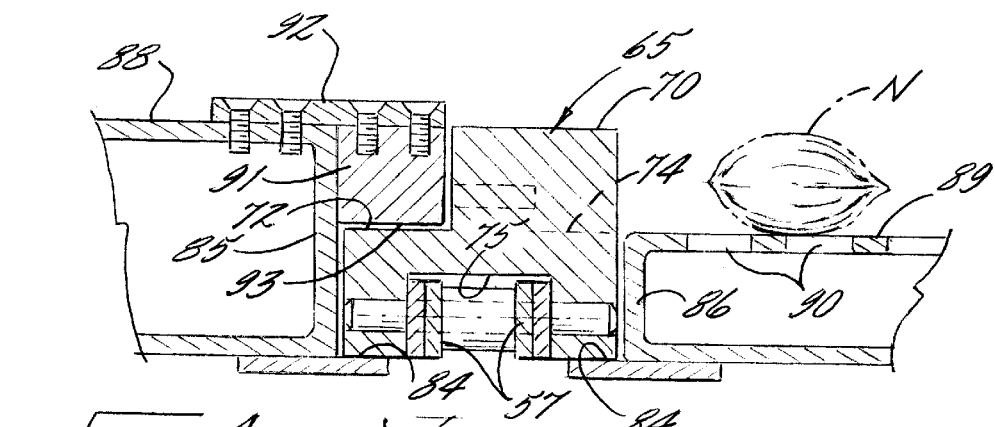
FIGS. 4, 5 and 7 are fragmentary sectional elevation views taken substantially along the lines 4—4; 5—5; and 7—7 of FIG. 2 respectively.

Each element 65 further includes a longitudinal channel 75 in the bottom face 71 for receiving the feed chain 57, and a pair of transverse pins for interconnecting the element to the chain, note FIG. 4. Further, each element 65 includes a slot 76 which extends longitudinally along the full length of the vertical wall of the notch 72 as seen in FIG. 3, and which is disposed parallel to the bottom face 71 of the element. The slot 76 extends laterally a portion of the distance from the notch 72 to the side 67, and communicates with the receptacle 74. The portion of the upper face 70 forwardly of receptacle 74 may be inclined downwardly, so that the portion rearwardly of the receptacle 74 in effect protrudes upwardly so as to catch the nuts in the hopper and knock them into the receptacle.

The conveyor 56 is powered by the motor 80 and drive chain 82, which drives the sprocket 59 and which also drives the turret 22 in the manner seen in FIG. 1, and such that the transport elements 65 and thus the nuts move from the hopper tangentially past the circle defined by the rotating cracking units 24, at a speed corresponding to such rotational speed. Also, the common drive 80, 82 permits the movements of the feed conveyor 56 and the turret 22 to be coordinated so that at the delivery point, each of the cracking units 24 is aligned with a respective one of the nut transport elements 65, with the anvil 32 and cracking die 35 thereof being disposed on opposite sides of the nut transport element and aligned with the receptacle 74.

Figure 5:
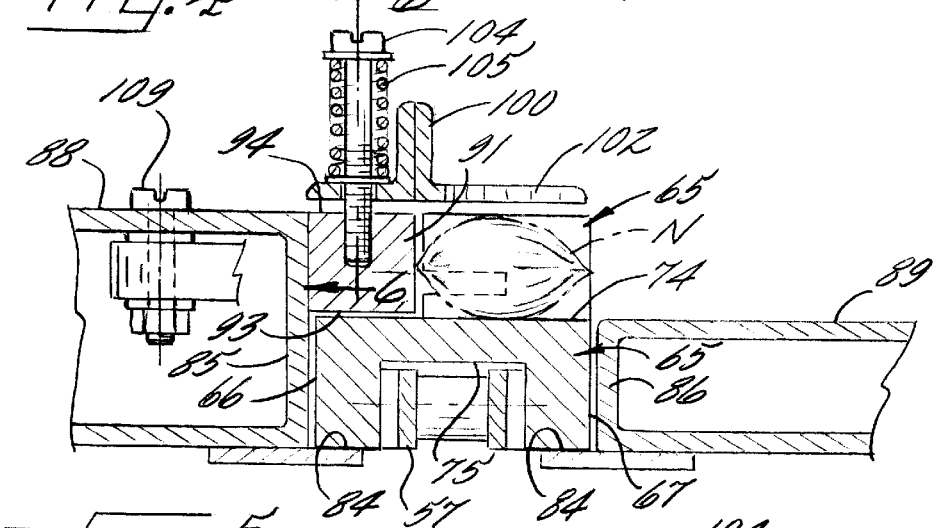
Figure 7:
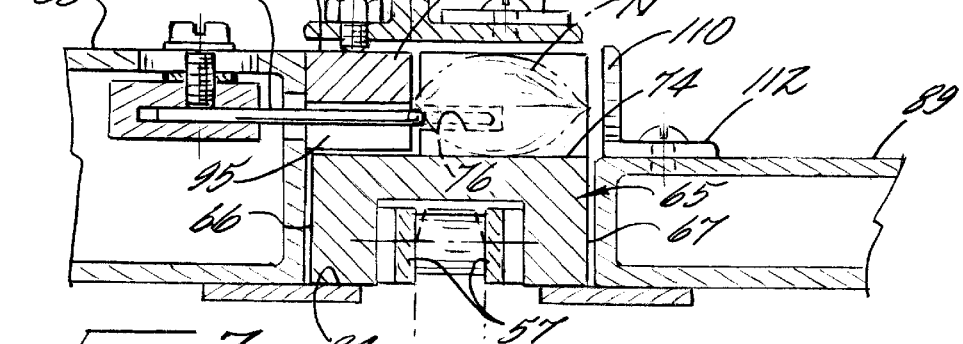

A rectangular channel (note FIGS. 4, 5, and 7) is formed in the bottom wall of the hopper 55 and which serves to partially receive and guide the nut transport elements 65 of the conveyor. The channel is defined in part by a bottom wall surface 84 which supports the elements, and opposite side walls 85, 86. The bottom wall of the hopper includes a first bottom wall portion 88 which is on the side of the elements which includes the longitudinal notch 72, and as best seen in FIGS. 4, 5, and 7, the first bottom wall portion 88 defines a plane which is generally coplanar with a plane defined by the upper faces 70 of the elements 65.

The hopper further includes a second bottom wall portion 89 which is on the side of the elements opposite the first bottom wall portion 88, with the second bottom wall portion 89 lying in a plane below the plane defined by the first bottom wall portion and so as to be generally aligned with the bottom of the receptacles 74 in the elements, note. FIG. 5. Also, the second bottom wall portion 89 of the hopper may include slots 90 for permitting the removal of shell fragments and other debris.

A longitudinally extending spacer bar 91 is fixed to the hopper by a pair of straps 92 and is sized and positioned to occupy the notches 72 of a plurality of the elements 65 as they move through the hopper with the feed chain. The spacer bar 91 has a longitudinal length sufficient to overlie the path of the nut transport elements from a point midway along the upwardly inclined segment 56a, along the transition juncture, and to a point immediately upstream of the delivery point below the turret, note FIG. 1.

The spacer bar 91 is a rectangular solid as seen in cross section, and it is made of a suitable metal or plastic. As best seen in FIG. 5, the bar includes a lower surface 93 which rests upon or is closely adjacent the bottom of the notches 72 in the elements 65, and a top surface 94. Also, the height of the spacer bar closely corresponds to the depth of the notches 72. The lower surface 93 includes a cut-out 95 for the purpose described below. A second cut-out 96 is provided in an arcuately curved portion which overlies the transition juncture, with the second cut-out 96 being designed to accommodate the edges of the elements 65 as they move about the curved juncture 64.

Figure 8:
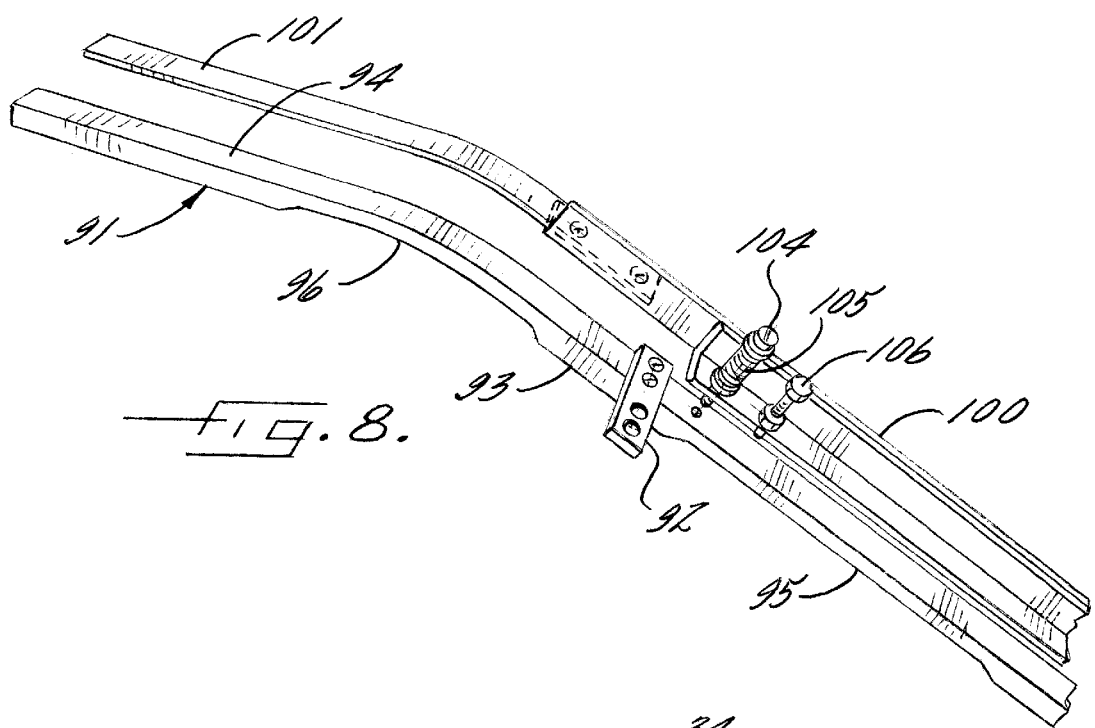
FIG. 8 is a fragmentary perspective view of an end portion of the spacer bar and singularizing plate of the present invention.

The hopper 55 includes singularizing and orienting means to ensure that any nuts in excess of one are removed from the receptacle 74 of each nut transport element 65, and that each nut is oriented with its end to end direction extending axially along the receptacle 74. This singularizing and orienting means includes a deflecting plate 100 which is designed for laterally deflecting the upper portion of any upstanding nuts disposed in each receptacle toward the right side of the element as seen in FIG. 2, as the element moves through the hopper, to thereby laterally orient the nuts. The plate 100 has a forward edge 102, and a length sufficient to continuously overlie the path of the nut transport elements 65 from a point along the upwardly inclined segment, along the transition juncture 64, and to a point immediately upstream of the delivery point. The downstream portion of the plate 100 is composed of a relatively thin extension 101 which is curved to conform to the transition juncture, and to the curvature of the spacer bar 91, note FIG. 8. In addition, the plate 100 is mounted to the spacer bar so that the forward edge 102 extends diagonally across the path of the elements.

The plate 100 is mounted to the top surface 94 of the spacer bar 91 by an arrangement which includes a resilient interconnection whereby the plate may be lifted upwardly a limited distance against a biasing force. Thus the plate 100 may be lifted upwardly from the elements 65 in the event a foreign object, such as a rock, enters the hopper and moves between the elements 65 and the plate 100.

Figure 6:
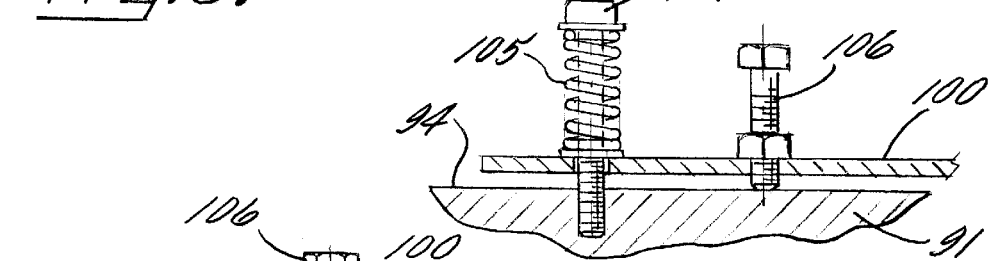
FIG. 6 is a fragmentary sectional elevation taken substantially along the line 6—6 of FIG. 5.

As best seen in FIG. 6, each resilient interconnection includes a pair of longitudinally spaced apart connectors which are each composed of a bolt 104 which extends freely through a flange on the plate 100 and is threaded into a bore in the spacer bar 91. A spring 105 is coaxially mounted on the upper end of the bolt 104 so as to bias the flange downwardly toward the spacer bar. To limit this downward movement, a second bolt 106 is threaded through a bore in the flange so as to engage the top surface 94 of the bar. Thus by rotation of the second bolt 106, the spacing between the plate and the spacer bar can be adjusted.

The singularizing and orienting means of the apparatus further includes means for laterally ejecting any laterally oriented nuts in excess of one from each receptacle. This ejecting means comprises an arm 108, which is mounted in the hopper so that the arm extends below the bottom wall portion 88, through an opening in the side wall 85, and then through the cut-out 95 in the spacer bar 91 (note FIG. 7). The arm 108 further extends a predetermined lateral distance into the slot 76 of each advancing element 65, to thereby deflect each nut therein which is adjacent the notch 72 and so that it moves toward the second side 67. The arm 108 is mounted for pivotal adjustment about the mounting pin 109, and is typically positioned to extend into the slot 76 so that the distance between the innermost portion of the arm and the side 67 corresponds to the average length of the nut being processed. Thus in the event two undersized nuts are positioned in any receptacle in end to end alignment, the arm 108 will serve to eject the one closest to the side 67. It will also be noted from FIG. 2 that the elongate deflecting plate 100 overlies the operative portion of the ejecting arm 108, and thus serves to prevent nuts from lifting upwardly from the associated receptacle upon being contacted by the arm.

The hopper 55 also mounts an upwardly inclined guide surface 110 which is positioned on a support member 112 which is secured along the side 67 of the elements 65, and downstream of the deflecting edge 102 of the plate 100 and the ejecting arm 108. The guide surface 110 is positioned so as to contact that portion of any nut extending laterally from its supporting receptacle 74 on the side 67, and acts to move the nut back into the receptacle.

As will be apparent, when the apparatus is operating at high speed, the nuts will tend to lift completely out of the receptacles when passing over the transition juncture 64, by reason of their upward inertia. The curved extension 101 of the plate 100 which overlies the transition juncture serves to limit such upward lifting, and the extension also eliminates the bouncing of the nuts as they rapidly move toward the delivery point, so as to maintain their orientation in the receptacles of the nut transport elements.

As the nut transport elements 65 advance along the horizontal segment toward and under the delivery point, they are supported by a support plate 113 which is adjustable in elevation with respect to the cracking units in the turret 22. A detailed disclosure of the structure and function of the supporting plate 113 may be obtained from U.S. Pat. No. 6,205,915, the disclosure of which is incorporated by reference.

To describe the operation of the apparatus in more detail, it will be understood that the motor 80 and drive chain 82 act to rotate the turret 22 about the central axis of the shaft 20, and to advance the conveyor 56 so that the upper run moves toward the turret at a speed corresponding to the rotational speed of the cracking units 24. The nut transport elements 65 thereby move in succession through the hopper 55, and the nuts therein are received in the receptacles 74, and singularized and oriented by contact with the plate 100, and arm 108, in the manner described above. The nuts are thereby effectively individually received in the respective receptacles 74, and oriented with their end to end direction being disposed horizontally and perpendicular to the direction of movement of the upper run of the conveyor.

By design, the nuts are moved in succession to the openings between the anvil 32 and cracking die assembly 34 of a cracking unit 24 as the cracking unit passes a nut delivery or loading point, which is located at about the bottom dead center of the circle defined by the rotating cracking units. By adjustment of the elevation of the support plate 113, the centerline of the nuts being processed can be accurately aligned with the axis along which the anvil and cracking die are moved. At this point, pressurized air is directed to the first port 40 of the cracking unit. The piston 38 and anvil 32 are thereby moved forwardly, and such that the anvil operatively engages one end of the nut N in the opening, and with the force acting through the nut to clampingly engage and retain the nut in an end to end alignment between the anvil 32 and the cracking die 35 of the die assembly 34. The nut is thereby lifted from its receptacle on the feed conveyor 56. The frictional contact between the piston 38 and the walls of the air cylinder 37 serve to maintain the forward axial position of the anvil during rotational movement of the cracking unit upwardly and away from the conveyor.

The nut is then advanced along a curvilinear path of travel, i.e., the circle defined by the rotating cracking units 24, and to a nut stressing location, which is located about 60 degrees beyond the bottom dead center. At this location, air again enters the first port 40 to compressively stress the retained nut. Immediately thereafter, high pressure air is injected into the port 48 of the air cylinder 44, such that the shuttle 46 is thrust forwardly along the cylinder 44 and impacts against the rear side of the cracking die 35, causing the cracking die to sharply advance a short distance forwardly and thereby crack the nut. The air in front of the advancing shuttle exhausts through the port 47, which is of relatively large diameter to accommodate the entering air without an undue build-up of pressure. Most of the loose shell fragments resulting from the cracking operation are drawn off through a housing by a vacuum line (not shown). Further, the cracking operation preferably occurs while the nut remains under compressive stress.

The cracked nut remains supported between the anvil and cracking die after the cracking operation, and is carried to a release point, which is preferably positioned at about 45 degrees beyond the top dead center position of the turret. At this point, air enters the second port 42, and the piston and anvil are moved rearwardly. The released nut then falls to the laterally directed discharge chute 115 (FIG. 1).

As the final step, air is caused to enter the port 47, and the shuttle 46 to return to its rearward position. The cycle may then be repeated as the cracking units move through the loading position to receive another nut from an aligned receptacle.

In the drawings and specification, there has been set forth a preferred embodiment of the invention, and although specific terms are employed, they are used in a generic and descriptive sense only and not for purposes of limitation.

That which is claimed:

1. An apparatus for successively delivering relatively small nuts, such as pecan seedlings, in a predetermined orientation to a cracking head of a nutcracker or the like, comprising a hopper for storing a relatively large quantity of the nuts to be cracked, endless conveyor means having an upper run extending through said hopper to a delivery point exteriorly thereof, with said conveyor means comprising a feed chain and a plurality of nut transport elements mounted in succession on said feed chain, with each element being of generally block-like configuration and having an upper face, with the upper face of each element having a longitudinally extending notch formed in an upper corner thereof and a generally semi-cylindrical upwardly facing receptacle extending laterally across the remainder of the upper face, power means for rotating said endless conveyor means such that said nut transport elements move in succession through said hopper and to said delivery point, a longitudinally extending spacer bar fixed in the hopper and being sized and positioned to occupy the notches of a plurality of the elements as they move through the hopper with the feed chain, and singularizing and orienting means mounted along said upper run of said endless conveyor means for effectively removing any nuts in excess of one from the receptacle of each nut transport element and for effectively orienting such nut with its end to end direction extending along the receptacle.

2. The apparatus as defined in claim 1 wherein said spacer bar includes an upper surface which is generally coplanar with the upper faces of the elements as they move through the hopper.

3. The apparatus as defined in claim 2 wherein said hopper includes a first bottom wall portion which is on a first side of the elements which includes the longitudinal notch, with the first bottom wall portion defining a plane which is generally coplanar with a plane defined by the upper surface of the spacer bar.

4. The apparatus as defined in claim 3 wherein said hopper further includes a second bottom wall portion which is adjacent a second side of the elements which is opposite the first side, with the second bottom wall portion lying in a plane below the plane defined by the first bottom wall portion and so as to be generally aligned with a bottom of the receptacles in the elements.

5. The apparatus as defined in claim 4 wherein said upper run of said endless conveyor means includes an upwardly inclined segment extending through the lower portion of said hopper and a substantially horizontal segment extending from said upwardly inclined segment to said delivery point, and with the upwardly inclined segment and the horizontal segment defining a transition juncture therebetween.

6. The apparatus as defined in claim 5 wherein said spacer bar has a longitudinal length sufficient to overlie the path of the nut transport elements from a point along said upwardly inclined segment, along said transition juncture, and to a point immediately upstream of said delivery point.

7. The apparatus as defined in claim 1 wherein the receptacle of each nut transport element communicates with both the notch and the second side of the associated element, and wherein said singularizing and orienting means comprises means for laterally deflecting the upper portion of each of any upstanding nuts disposed in each receptacle toward said opposite side of the associated element as the element moves through said hopper to thereby laterally orient the nuts, and means for laterally ejecting any laterally oriented nuts in excess of one from each receptacle.

8. The apparatus as defined in claim 7 wherein said deflecting means comprises a plate having a forward edge, and means mounting said plate to said spacer bar so as to overlie the path of said nut transport elements and such that said forward edge extends diagonally across such path.

9. The apparatus as defined in claim 8 wherein said means mounting said plate to said spacer bar includes a resilient interconnection between the spacer bar and the plate whereby the plate may be lifted upwardly with respect to the spacer bar and the elements against a biasing force.

10. The apparatus as defined in claim 9 wherein each nut transport element includes a longitudinal slot communicating with the full length of the notch as well as with the associated receptacle, and with said slot extending from the notch laterally a substantial portion of the lateral distance from the notch to the second side of the element, and wherein said ejecting means comprises an arm, and means mounting said arm in said hopper so that the arm extends a predetermined lateral distance into the slot of each advancing element and thereby deflects each nut therein which is adjacent said notch toward said second side.

11. The apparatus as defined in claim 10 wherein said means mounting said arm is adjustable so as to permit the lateral extent of its entry into the slots to be selectively controlled.

12. The apparatus as defined in claim 10 wherein said plate has a longitudinal length sufficient to overlie at least a plurality of said elements and an operative portion of said ejecting arm, and such that the plate prevents nuts from lifting upwardly from the associated receptacle upon being contacted by said arm.

13. The apparatus as defined in claim 12 further comprising guide surface means mounted in said hopper downstream of said arm of said ejecting means and adjacent said second side of said elements for contacting that portion of any nut extending laterally from its supporting receptacle axially back into the receptacle.

14. A high production nutcracking apparatus comprising,
means for advancing a plurality of nuts individually in succession along a first path of travel with at least substantially all of the advancing nuts being disposed in a predetermined orientation,
means for removing the advancing nuts in succession from the first path of travel and advancing the removed nuts in succession along a generally curvilinear second path of travel, and including means for clampingly engaging each nut during its removal from the first path of travel and advance along the second path of travel so as to preserve the predetermined orientation of each nut, and
means for imparting a cracking force to each nut while being advanced along the second path of travel, and with the cracking force being applied in a direction corresponding to the clamping engagement of the nut,
said means for advancing nuts along the first path of travel comprising
(a) a hopper for storing a relatively large quantity of the nuts to be cracked,
(b) endless conveyor means having an upper run extending through said hopper to a delivery point exteriorly thereof, with said conveyor means comprising a feed chain and a plurality of nut transport elements mounted in succession on said feed chain, with each element being of generally block-like configuration and having an upper face, with the upper face of each element having a longitudinally extending notch formed in an upper corner thereof and a generally semi-cylindrical upwardly facing receptacle extending laterally across the remainder of the upper face,
(c) power means for rotating said endless conveyor means such that said nut transport elements move in succession through said hopper and to said delivery point, and
(d) a longitudinally extending spacer bar fixed in the hopper and being sized and positioned to occupy the notches of a plurality of the elements as they move through the hopper,
(e) singularizing and orienting means mounted along said upper run of said endless conveyor means for effectively removing any nuts in excess of one from the receptacle of each nut transport element and for effectively orienting such nut with its end to end direction extending along the receptacle.

\* \* \* \* \*